US011361790B2

(12) United States Patent
Endo

(10) Patent No.: US 11,361,790 B2
(45) Date of Patent: Jun. 14, 2022

(54) MAGNETIC RECORDING MEDIUM

(71) Applicant: Sony Corporation, Tokyo (JP)

(72) Inventor: Tetsuo Endo, Miyagi (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 16/069,427

(22) PCT Filed: Dec. 14, 2016

(86) PCT No.: PCT/JP2016/005122
§ 371 (c)(1),
(2) Date: Jul. 11, 2018

(87) PCT Pub. No.: WO2017/122247
PCT Pub. Date: Jul. 20, 2017

(65) Prior Publication Data
US 2019/0035424 A1 Jan. 31, 2019

(30) Foreign Application Priority Data
Jan. 15, 2016 (JP) .............................. JP2016-006372

(51) Int. Cl.
G11B 5/73 (2006.01)
G11B 5/78 (2006.01)
G11B 5/706 (2006.01)
G11B 5/008 (2006.01)

(52) U.S. Cl.
CPC ........ G11B 5/7368 (2019.05); G11B 5/00813 (2013.01); G11B 5/70605 (2013.01); G11B 5/7363 (2019.05); G11B 5/7369 (2019.05); G11B 5/7371 (2019.05); G11B 5/78 (2013.01)

(58) Field of Classification Search
CPC ... G11B 5/00813; G11B 5/70605; G11B 5/78; G11B 5/7371; G11B 5/7368; G11B 5/7369; G11B 5/7363
See application file for complete search history.

(56) References Cited

U.S. PATENT DOCUMENTS

2011/0229739 A1\* 9/2011 Jensen ................. G11B 5/7085
428/838
2014/0342189 A1 11/2014 Tachibana et al.

FOREIGN PATENT DOCUMENTS

| JP | S60-138723 A | 7/1895 |
| JP | H10113108 A | 5/1998 |
| JP | H11128363 A | 5/1999 |
| JP | 2001-351225 A | 12/2001 |
| JP | 2002-304720 A | 10/2002 |
| JP | 2002-304721 A | 10/2002 |
| JP | 2014-241182 A | 12/2014 |
| WO | WO-2013121726 A1 | 8/2013 |

OTHER PUBLICATIONS

Kapoor, "An Overview of Nitinol: Superelastic and Shape Memory", https://www.medicaldesignbriefs.com/component/content/article/mdb/features/articles/23077, Oct. 2015, pp. 1-7) (Year: 2015).\*
International Search Report and Written Opinion issued in connection with International Patent Application No. PCT/JP2016/005122, dated Feb. 7, 2017. (9 pages).

\* cited by examiner

Primary Examiner — Holly Rickman
(74) Attorney, Agent, or Firm — K&L Gates LLP

(57) ABSTRACT

A magnetic recording medium includes: a substrate; a recording layer; and a layer being provided between the substrate and the recording layer, the layer containing a superelastic body.

11 Claims, 4 Drawing Sheets

MAGNETIC RECORDING MEDIUM

CROSS-REFERENCE TO RELATED APPLICATIONS

The present application claims the benefit of International Application No. PCT/JP2016/005122, filed Dec. 14, 2016, which claims priority to Japanese Application No. 2016-006372, filed Jan. 15, 2016, the disclosures of which are incorporated herein by reference.

BACKGROUND

The present technology relates to a magnetic recording medium.

Magnetic recording media are widely used as data storage media. In recent years, improvement of reliability of a magnetic recording medium is desired. In order to improve the reliability, for example, Patent Documents 1 and 2 disclose that a reinforcing layer including a metal, a semi-metal, or the like is formed on at least one main surface of a non-magnetic support.

SUMMARY

Problems to be Solved by the Invention

An object of the present technology is to provide a magnetic recording medium capable of improving reliability.

Solutions to Problems

To solve the problem, the present technology is a magnetic recording medium including: a substrate; a recording layer; and a layer being provided between the substrate and the recording layer, the layer containing a superelastic body.

Effects of the Invention

As described above, according to the present technology, it is possible to improve reliability of a magnetic recording medium.

DETAILED DESCRIPTION

Figure 1:
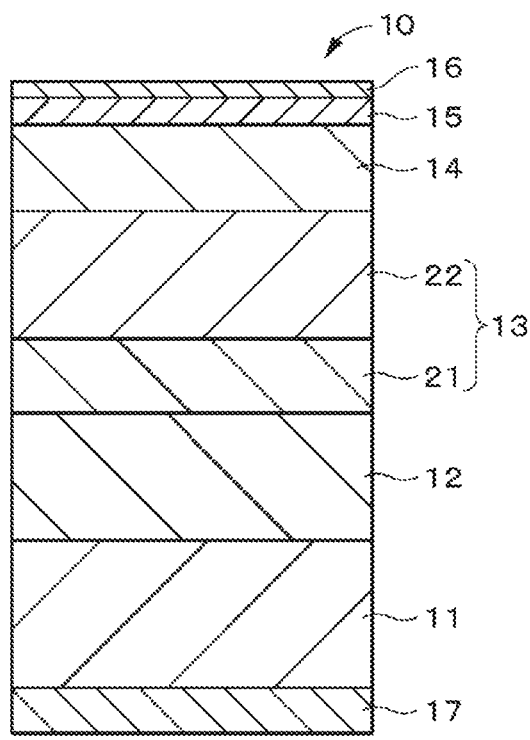
FIG. 1 is a cross-sectional diagram schematically illustrating an example of a configuration of a magnetic recording medium according to a first embodiment of the present technology.

In the present technology, a magnetic recording medium preferably includes a crystal control layer that controls a crystalline state of a recording layer. The crystal control layer preferably includes a base layer, and more preferably includes a seed layer and a base layer. Each layer of the seed layer, the base layer, and the recording layer may be either a single-layer structure or a multi-layer structure. From the viewpoint of improving recording and reproducing characteristics, it is preferable to adopt a multi-layer structure. From the viewpoint of production efficiency, it is preferable to adopt a two-layer structure among the multi-layer structures.

In the present technology, it is preferable that the magnetic recording medium further includes a soft magnetic layer. As a structure of the soft magnetic layer, either a single-layer structure or a multi-layer structure may be used, but from the viewpoint of improving the recording and reproducing characteristics, it is preferable to use a multi-layer structure. As a soft magnetic layer having a multi-layer structure, it is preferable that a first soft magnetic layer, an intermediate layer, and a second soft magnetic layer are included, and the intermediate layer is provided between the first soft magnetic layer and the second soft magnetic layer.

In the present technology, in a case where the magnetic recording medium includes the crystal control layer that controls the crystalline state of the recording layer, it is preferable that a layer containing a superelastic body is provided between a substrate and the crystal control layer. This is because if the layer containing the superelastic body is provided between the crystal control layer and the recording layer, the control of the crystalline state of the recording layer by the crystal control layer is hindered. In addition, in a case where the magnetic recording medium includes the soft magnetic layer, it is preferable that the layer containing the superelastic body is provided between the substrate and the soft magnetic layer. This is because if the layer containing the superelastic body is provided between the soft magnetic layer and the recording layer, it is difficult to induce a head magnetic flux into the soft magnetic layer. In a case where the magnetic recording medium includes the soft magnetic layer and the crystal control layer provided between the soft magnetic layer and the recording layer, it is preferable that the layer containing the superelastic body is provided between the substrate and the soft magnetic layer The reason for this is as follows. If the layer containing the superelastic body is provided between the crystal control layer and the recording layer, the control of the crystalline state of the recording layer by the crystal control layer is hindered, and it is difficult to induce the head magnetic flux into the soft magnetic layer. In addition, if the layer containing the superelastic body is provided between the soft magnetic layer and the crystal control layer, it is difficult to induce the head magnetic flux into the soft magnetic layer.

Embodiments of the present technology will be described in the following order. In addition, in all the drawings of the embodiments below, the same or corresponding components are denoted by the same reference numerals.

1. First Embodiment (Example of Magnetic Recording Medium Having Crystal Control Layer)
   1.1. Overview
   1.2. Configuration of Magnetic Recording Medium
   1.3. Configuration of Sputtering Apparatus
   1.4. Manufacturing Method of Magnetic Recording Medium
   1.5. Effect
   1.6. Modified Example
2. Second Embodiment (Example of Magnetic Recording Medium Having Soft Magnetic Underlayer)
   2.1. Configuration of Magnetic Recording Medium
   2.2. Effect
   2.3. Modified Example
3. Third Embodiment (Example of Magnetic Recording Medium Having Coating Type Recording Layer)
   3.1. Overview
   3.2. Configuration of Magnetic Recording Medium
   3.3. Magnetic Recording Medium Manufacturing Method
   3.4. Effect
   3.5. Modified Example 1. First Embodiment 1.1. Overview An elongated magnetic recording medium having flexibility may be plastically deformed by a load. In a recording/reproducing system of the magnetic recording medium, good sliding between a medium and a head is a prerequisite. However, if the plastic deformation occurs as described above, the spacing increases, and thus, there is a concern that the reliability decreases. Therefore, as a result of intensive studies to improve the reliability of a magnetic recording medium, the present inventors have found out that a layer containing a superelastic body (hereinafter, referred to as a "superelastic thin film") is provided between a substrate and a recording layer. Hereinafter, a magnetic recording medium having such a superelastic thin film will be described.

1.2. Configuration of Magnetic Recording Medium

A magnetic recording medium 10 according to the first embodiment of the present technology is a so-called elongated single-layer perpendicular magnetic recording medium and includes, as illustrated in FIG. 1, a substrate 11, a superelastic thin film 12 provided on one main surface (hereinafter, referred to as a "surface") of the substrate 11, a crystal control layer 13 provided on the superelastic thin film 12, a recording layer 14 provided on the crystal control layer 13, a protective layer 15 provided on the recording layer 14, and a lubricating layer 16 provided on the protective layer 15. In addition, the magnetic recording medium 10 according to the first embodiment further includes a back coat layer 17 provided on the other main surface (hereinafter, referred to as a "back surface") of the substrate 11. The crystal control layer 13 is a layer for controlling the crystalline state of the recording layer 14 and includes a seed layer 21 provided on the surface of the superelastic thin film 12 and a base layer 22 provided on the seed layer 21.

In addition, in this specification, a magnetic recording medium not having a soft magnetic underlayer (hereinafter, referred to as an "SUL") is referred to as a "single-layer perpendicular magnetic recording medium", and a magnetic recording medium having an SUL is referred to as a "double-layer perpendicular magnetic recording medium".

The magnetic recording medium 10 according to the first embodiment is suitable for use as a storage medium for a data archive of which demand is expected to further increase in the future. This magnetic recording medium 10 can realize, for example, a surface recording density of 10 times or more the surface recording density of the current coating type magnetic tape for storage, that is, a surface recording density of 50 Gb/in$^2$. In a case where a general linear recording type data cartridge is configured by using the magnetic recording medium 10 having such a surface recording density, it is possible to record a large capacity of 50 TB or more per data cartridge. This magnetic recording medium 10 is suitable for use in a recording/reproducing apparatus using a ring type recording head and a giant magnetoresistive (GMR) type reproducing head.

Substrate

The substrate 11 as a support is an elongated non-magnetic substrate having flexibility. The non-magnetic substrate is a film, and the thickness of the film is, for example, 3 μm or more and 8 μm or less. As a material of the substrate 11, for example, a flexible polymer resin material used for a general magnetic recording medium can be used. Specific examples of the polymer material include a polyester resin, a polyolefin resin, a cellulose derivative, a vinyl resin, a polyimide resin, a polyimide resin (for example, an aramid resin), a polycarbonate resin, and the like. From the viewpoint of heat resistance, a polyimide resin or an aramid resin is preferred.

Superelastic Thin Film

The superelastic thin film 12 is a layer that suppresses plastic deformation of the magnetic recording medium 10. It is preferable that, even if the superelastic thin film 12 is deformed by applying a load to the superelastic thin film 12, the shape of the superelastic thin film 12 is restored to the substantially original shape at the temperature or less in the drive for the magnetic recording medium at the time of use after unloading. Therefore, by restoring the shape of the superelastic thin film 12 in a state where the magnetic recording medium 10 is loaded in the drive and used, it is possible to suppress the plastic deformation of the magnetic recording medium 10. Accordingly, by suppressing an increase in spacing due to the plastic deformation, it is possible to and suppress a deterioration in recording performance reliability. Herein, the load applied to the superelastic thin film 12 may be a load that is applied to the superelastic thin film 12 at the time of manufacturing or transporting the magnetic recording medium 10, may be a load that is applied at the time of mounting the cartridge of the magnetic recording medium 10, or may be a load that is applied at the time of using the magnetic recording medium 10 (at the time of recording or reproducing).

The superelastic thin film 12 is a layer containing superelastic alloy as a superelastic body. The superelastic alloy is preferably an alloy containing Ti and Ni (hereinafter, referred to as a "TiNi-based alloy"). The TiNi-based alloy may further contain one or more selected from the group including Co, Fe, Mn, Cr, V, Al, Nb, W, B, Au, Pd, Cu, Pb, Zr, and the like.

The content of Ni in the TiNi-based alloy is preferably in a range of 50 atomic % (hereinafter, referred to as "at %") or more and 50.5 at % or less. If the content of Ni is within the above range, a TiNi-based alloy having excellent superelasticity can be obtained. In addition, a TiNi-based alloy exhibiting superelastic function at a low temperature of 45° or less can be obtained. Since the temperature in a drive for the magnetic recording medium at the time of use generally exceeds 45°, it is possible to restore the shape of the magnetic recording medium 10 in a state where the magnetic recording medium 10 is loaded in the drive and used.

Seed Layer

The seed layer 21 contains an alloy containing Ti and Cr and has an amorphous state. In addition, O (oxygen) may be further contained in this alloy. This oxygen is a small amount of impurity oxygen contained in the seed layer 21 when the seed layer 21 is formed by a film formation method such as a sputtering method, for example.

Herein, the "seed layer" denotes a layer that has a crystal structure similar to that of the base layer 22 and is not an intermediate layer provided for the purpose of crystal growth but an intermediate layer improving the perpendicular orientation of the base layer 22 according to the amorphous state of the seed layer 21. The "alloy" denotes at least one of a solid solution, a eutectic body, an intermetallic compound, and the like containing Ti and Cr. The "amorphous state" denotes that a halo is observed by an electron diffraction method, and thus, the crystal structure cannot be specified.

The atomic ratio of Ti to the total amount of Ti and Cr contained in the seed layer 21 is preferably in a range of 30 at % or more and 100 at % or less, and more preferably in a range of 50 at % or more and 100 at % or less. If the atomic ratio of Ti is less than 30%, the (100) plane of the body-centered cubic (bcc) lattice structure of Cr is oriented, there is a concern that the orientation of the base layer 22 formed on the surface of the seed layer 21 may be deteriorated.

The atomic ratio of Ti can be obtained as follows. A depth-direction analysis (depth profile measurement) of the seed layer 21 by Auger electron spectroscopy (hereinafter, referred to as an "AES") is performed while performing ion milling from the side of the lubricating layer 16 of the magnetic recording medium 10. Next, from the obtained depth profile, the average composition (average atomic ratio) of Ti and Cr in the thickness direction is obtained. Next, the atomic ratio of Ti is obtained by using the obtained average composition of Ti and Cr.

In a case where the seed layer 21 contains Ti, Cr, and O, the atomic ratio of O to the total amount of Ti, Cr, and O contained in the seed layer 21 is preferably 15 at % or less, and more preferably 10 at % or less. If the atomic ratio of O exceeds 15 at %, the formation of $TiO_2$ crystal affects the formation of crystal nuclei of the base layer 22 formed on the surface of the seed layer 21, and thus, there is a concern that the orientation of the base layer 22 is greatly deteriorated. The atomic ratio of O can be obtained by using an analysis method similar to that of the atomic ratio of Ti.

The alloy contained in the seed layer 21 may further contain elements other than Ti and Cr as additional elements. As this additional element, for example, one or more elements selected from the group including Nb, Ni, Mo, Al, W, and the like may be exemplified.

Base Layer

The base layer 22 has a crystal structure similar to that of the recording layer 14. In a case where the recording layer 14 contains a Co-based alloy, it is preferable that the base layer 22 contains a material having a hexagonal close packed (hcp) structure similar to that of the Co-based alloy, and the c-axis of the structure is oriented in a direction (that is, the film thickness direction) perpendicular to the film surface. This is because the orientation of the recording layer 14 can be enhanced and the lattice constant matching between the base layer 22 and the recording layer 14 can be made comparatively well. As a material having a hexagonal close packed (hcp) structure, Ru simple substance or a Ru alloy is preferred. As the Ru alloy, for example, a Ru alloy oxide such as Ru—$SiO_2$, Ru—$TiO_2$, or Ru—$ZrO_2$ may be exemplified.

Recording Layer

The recording layer 14 as a magnetic layer is a so-called perpendicular recording layer. From the viewpoint of improving the recording density, the recording layer 14 is preferably a granular magnetic layer containing a Co-based alloy. This granular magnetic layer includes ferromagnetic crystal grains containing Co-based alloy and non-magnetic grain boundaries (non-magnetic material) surrounding these ferromagnetic crystal grains. More specifically, the granular magnetic layer includes columns (columnar crystals) containing a Co-based alloy, non-magnetic grain boundaries (for example, oxide such as $SiO_2$) surrounding the columns and magnetically separating each column, and the like. In this structure, it is possible to configure the recording layer 14 having a structure where the columns are magnetically separated from each other.

The Co-based alloy has a hexagonal close packed (hcp) structure, and the c axis is oriented in a direction (film thickness direction) perpendicular to the film surface. As the Co-based alloy, it is preferable to use a CoCrPt-based alloy containing at least Co, Cr, and Pt. The CoCrPt-based alloy is not particularly limited, and the CoCrPt alloy may further contain an additional element. As the additional element, for example, one or more elements selected from the group including Ni, Ta, and the like may be exemplified.

The non-magnetic grain boundary surrounding the ferromagnetic crystal grain contains a non-magnetic metal material. Herein, the metal may include a semi-metal. As the non-magnetic metal material, for example, at least one of a metal oxide and a metal nitride may be used. From the viewpoint of maintaining the granular structure more stably, it is preferable to use a metal oxide. As the metal oxide, a metal oxide containing at least one element selected from the group including Si, Cr, Co, Al, Ti, Ta, Zr, Ce, Y, Hf, and the like may be exemplified, and a metal oxide containing at least Si oxide (that is, $SiO_2$) is preferred. As specific examples thereof, $SiO_2$, $Cr_2O_3$, CoO, $Al_2O_3$, $TiO_2$, $Ta_2O_5$, $ZrO_2$, $HfO_2$, or the like may be exemplified. As the metal nitride, a metal nitride containing at least one element selected from the group including Si, Cr, Co, Al, Ti, Ta, Zr, Ce, Y, Hf, and the like may be exemplified. As specific examples thereof, SiN, TiN, AlN, and the like may be exemplified.

It is preferable that the CoCrPt-based alloy contained in the ferromagnetic crystal grains and the Si oxide contained in the non-magnetic grain boundary have an average composition represented in the following formula (A). This is because it is possible to realize a saturation magnetization amount Ms that suppresses influence of a diamagnetic field and can ensure sufficient reproduction output, so that it is possible to further improve the recording and reproducing characteristics.

$$(Co_xPt_yCr_{100-x-y})_{100-z}—(SiO_2)_z \qquad (A)$$

(Herein, in the formula (A), x, y, and z are values in ranges of 69≤X≤75, 10≤y≤16, and 9≤Z≤12, respectively)

In addition, the above-mentioned composition can be obtained as follows. By performing analysis in the depth direction of the recording layer 14 by AES while ion milling from the side of the lubricating layer 16 of the magnetic recording medium 10, the average composition (average atomic ratio) of Co, Pt, Cr, Si, and O in the film thickness direction is obtained.

Protective Layer

The protective layer 15 contains, for example, a carbon material or silicon dioxide ($SiO_2$) and preferably contains a carbon material from the viewpoint of film strength of the protective layer 15. As the carbon material, for example, graphite, a diamond-like carbon (DLC), a diamond, and the like may be exemplified.

Lubricating Layer

The lubricating layer 16 contains at least one lubricant. The lubricating layer 16 may further contain various additives, for example, a rust inhibitor, as necessary. The lubricant contains, for example, at least one carboxylic acid based compound. In addition, as described above, the lubricant may be not only held as the lubricating layer 16 on the surface of the magnetic recording medium 10 but also contained and held in the layers such as the recording layer 14 and the protective layer 15 constituting the magnetic recording medium 10.

Back Coat Layer

The back coat layer 17 contains, for example, a binder, inorganic particles, and a lubricant. The back coat layer 17 may contain various additives such as a curing agent and an antistatic agent as necessary.

1.3. Configuration of Sputtering Apparatus

Hereinafter, an example of the configuration of the sputtering apparatus 30 used for manufacturing the magnetic recording medium 10 according to the first embodiment of the present technology will be described with reference to FIG. 2. The sputtering apparatus 30 is a continuous winding type sputtering apparatus used for forming the superelastic thin film 12, the seed layer 21, the base layer 22, and the recording layer 14 and includes a film formation chamber 31, a drum 32 that is a metal can (rotating body), cathodes 33a to 33d, a radiation source 34 for infrared ray irradiation, a supply reel 35, a take-up reel 36, and a plurality of guide rolls 38a to 38c and 39a to 39c.

The film formation chamber 31 is connected to a vacuum pump (not illustrated) through an exhaust port 37, and the atmosphere in the film formation chamber 31 is set to a predetermined degree of vacuum by the vacuum pump. In the film formation chamber 31, the drum 32 having a rotatable configuration, the supply reel 35, and the take-up reel 36 are arranged. In addition, in the film formation chamber 31, the plurality of guide rolls 38a to 38c for guiding the transportation of the substrate 11 between the supply reel 35 and the drum 32 are provided, and the plurality of guide rolls 39a to 39c for guiding the transportation of the substrate 11 between the drum 32 and the take-up reel 36 are provided. At the time of sputtering, the substrate 11 unwound from the supply reel 35 is wound around the take-up reel 36 through the guide rolls 38a to 38c, the drum 32, and the guide rolls 39a to 39c. The drum 32 has a cylindrical shape, and the elongated substrate 11 is transported along the circumferential surface of the cylindrical surface of the drum 32. A cooling mechanism (not illustrated) is provided on the drum 32, and at the time of sputtering, the circumferential surface of the drum 32 is cooled down to a predetermined temperature. Furthermore, in the film formation chamber 31, the plurality of cathodes 33a to 33d and the radiation source 34 are arranged so as to face the circumferential surface of the drum 32. Targets are set for the cathodes 33a to 33d, respectively. More specifically, the targets for forming the superelastic thin film 12, the seed layer 21, the base layer 22, and the recording layer 14 are set on the cathodes 33a, 33b, 33c, and 33d, respectively. By these cathodes 33a to 33d, a plurality of types of layers, that is, the superelastic thin film 12, the seed layer 21, the base layer 22, and the recording layer 14 are simultaneously formed. The radiation source 34 is, for example, an infrared heater and is provided between the cathodes 33a and 33b. As the infrared heater, for example, a sheathed heater, a ceramic heater, a halogen lamp heater, a quartz tube heater, or the like can be used.

In the sputtering apparatus 30 having the above-described configuration, the superelastic thin film 12, the seed layer 21, the base layer 22, and the recording layer 14 can be continuously formed by a roll-to-roll method.

1.4. Magnetic Recording Medium Manufacturing Method

Hereinafter, an example of a method of manufacturing the magnetic recording medium 10 according to the first embodiment of the present technology will be described.

Figure 2:
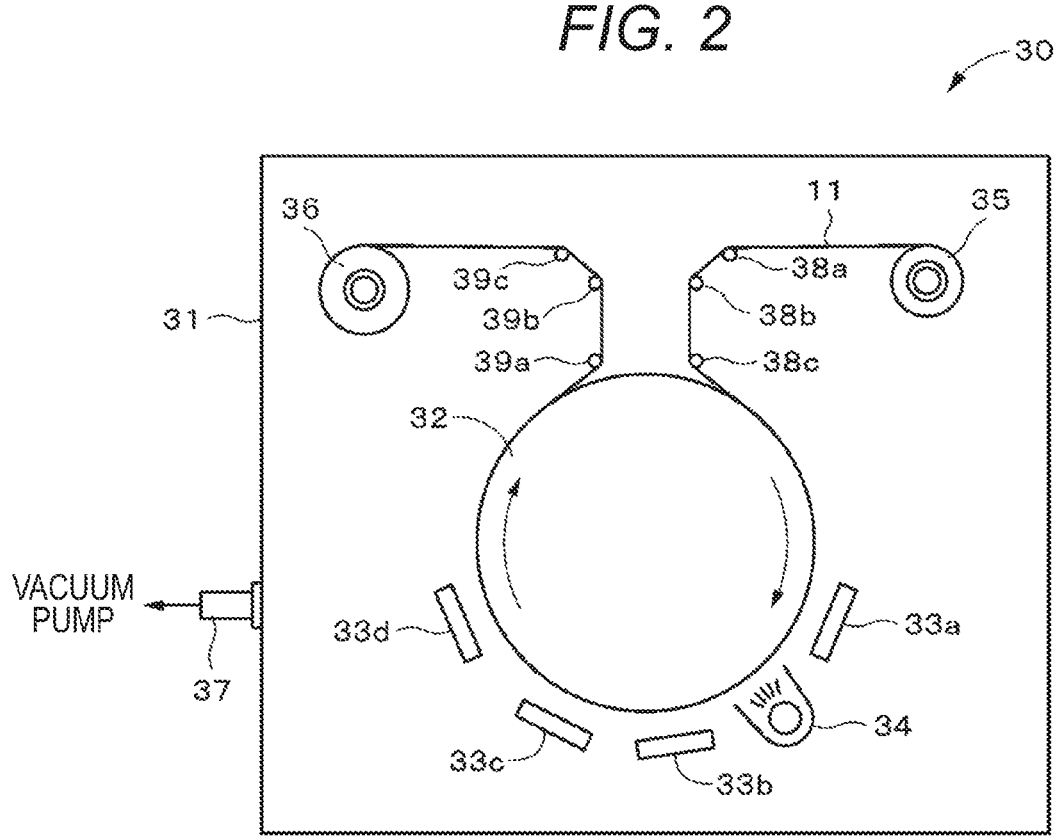
FIG. 2 is a schematic diagram illustrating an example of a configuration of a sputtering apparatus used for manufacturing the magnetic recording medium according to the first embodiment of the present technology.

Film Formation Process of Superelastic Thin Film, Seed Layer, Base Layer, and Recording Layer First, the superelastic thin film 12, the seed layer 21, the base layer 22, and the recording layer 14 are formed on the surface of the substrate 11 by using the sputtering apparatus 30 illustrated in FIG. 2. Specifically, films are formed as follows. First, the film formation chamber 31 is evacuated until the film formation chamber 31 reaches a predetermined pressure. After that, while introducing a process gas such as Ar gas into the film formation chamber 31, the targets set on the cathodes 33a to 33d are sputtered. Therefore, the superelastic thin film 12, the seed layer 21, the base layer 22, and the recording layer 14 are successively formed on the surface of the running substrate 11. In addition, after the superelastic thin film 12 is formed and before the seed layer 21 is formed, the superelastic thin film 12 is annealed (heat treated) by the radiation source 34 to be crystallized. Therefore, the superelastic function of the superelastic thin film 12 is exhibited.

The atmosphere of the film formation chamber 31 at the time of sputtering is set to be in a range of, for example, about $1\times10^{-5}$ Pa to about $5\times10^{-5}$ Pa. The film thicknesses and characteristics of the superelastic thin film 12, the seed layer 21, the base layer 22, and the recording layer 14 can be controlled by adjusting a tape line speed at which the substrate 11 is taken up, a pressure (sputtering gas pressure) of a process gas such as Ar gas introduced at the time of sputtering, an input electric power, and the like.

Film Formation Process of Protective Layer

Next, the protective layer 15 is formed on the recording layer 14. As a method of forming the protective layer 15, for example, a chemical vapor deposition (CVD) method or a physical vapor deposition (PVD) method can be used.

Film Formation Process of Back Coat Layer

Next, a coating material for forming a back coat layer is prepared by kneading and dispersing a binder, inorganic particles, a lubricant, and the like in a solvent. Next, the back coat layer 17 is formed on the back surface of the substrate 11 by applying the coating material for forming the back coat layer on the back surface of the substrate 11 and performing drying.

Film Formation Process of Lubricating Layer

Next, for example, the lubricating layer 16 is formed by applying a lubricant on the protective layer 15. As a coating method of the lubricant, for various coating methods such as gravure coating, dip coating, and the like can be used. Next, as necessary, the magnetic recording medium 10 is cut into a predetermined width. Therefore, the magnetic recording medium 10 illustrated in FIG. 1 is obtained.

1.5. Effect

In the magnetic recording medium 10 according to the first embodiment, the superelastic thin film 12 is provided between the substrate 11 and the crystal control layer 13. Even if the superelastic thin film 12 is deformed by a load, the shape of the superelastic thin film is restored to the substantially original shape after unloading. Therefore, the plastic deformation of the crystal control layer 13 and the recording layer 14 can be suppressed. Accordingly, by suppressing an increase in spacing due to the plastic deformation it is possible to improve the reliability of the magnetic recording medium 10.

1.6. Modified Example

Modified Example 1

Figure 3A:
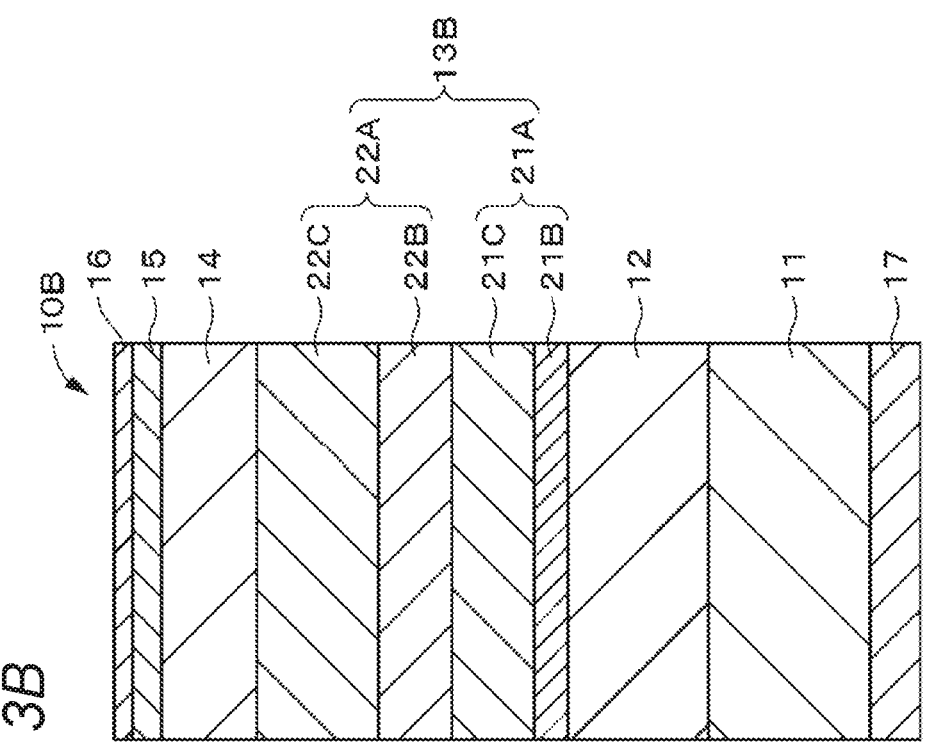
FIG. 3A is a cross-sectional diagram schematically illustrating an example of a configuration of a magnetic recording medium according to Modified Example 1 of the first embodiment of the present technology.

As illustrated in FIG. 3A, the magnetic recording medium 10A may include a crystal control layer 13A including a seed layer 21A having a two-layer structure. The seed layer 21A includes a first seed layer (lower seed layer) 21B and a second seed layer (upper seed layer) 21C. The first seed layer 21B is provided on the side of the substrate 11, and the second seed layer 21C is provided on the side of the base layer 22. As the first seed layer 21B, a seed layer similar to the seed layer 21 in the first embodiment can be used. The second seed layer 21C contains a material having a different composition from that of the first seed layer 21B. As a specific example of this material, NiW, Ta, or the like may be exemplified. In addition, the second seed layer 21C may not be a seed layer and may be regarded as an intermediate layer provided between the first seed layer 21B and the base layer 22.

The magnetic recording medium 10A includes the seed layer 21A having a two-layer structure, so that the orientation of the base layer 22 and the orientation of the recording layer 14 are further improved, and thus, the magnetic characteristics can be further improved.

Modified Example 2

Figure 3B:
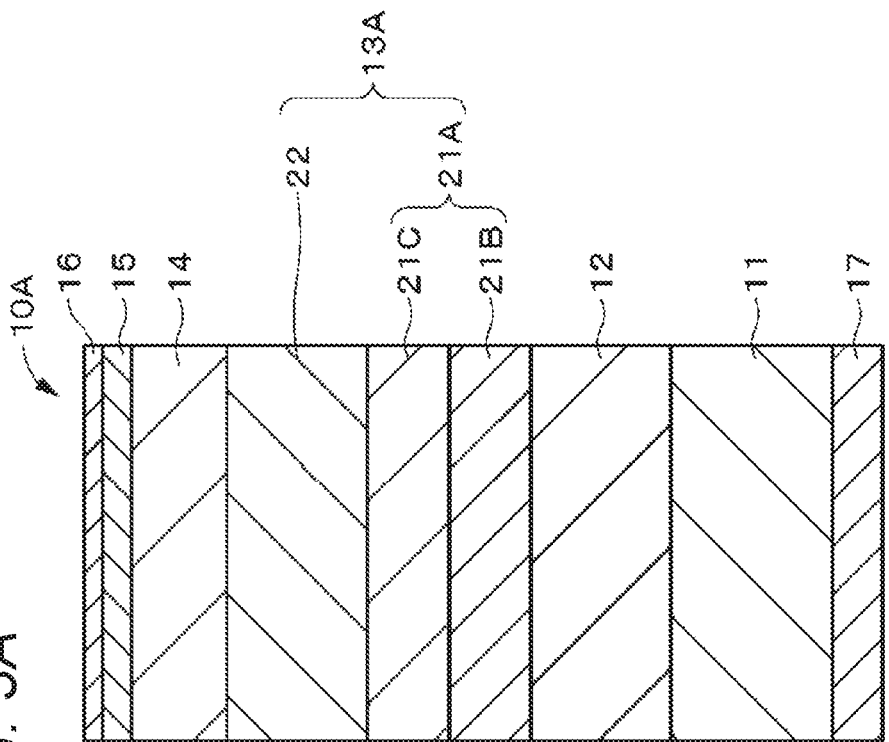
FIG. 3B is a cross-sectional diagram schematically illustrating an example of a configuration of a magnetic recording medium according to Modified Example 2 of the first embodiment of the present technology.

As illustrated in FIG. 3B, the magnetic recording medium 10B may include a crystal control layer 13B including a base layer 22A having a two-layer structure. The base layer 22A includes a first base layer (lower base layer) 22B and a second base layer (upper base layer) 22C. The first base layer 22B is provided on the side of the seed layer 21A, and the second base layer 22C is provided on the side of the recording layer 14.

As the materials of the first base layer 22B and the second base layer 22C, for example, a material similar to that of the base layer 22 in the first embodiment can be used. However, the intended effects are different between the first base layer 22B and the second base layer 22C, and thus, the respective film formation conditions (sputtering conditions) are different. That is, the second base layer 22C has a film structure that facilitates the granular structure of the recording layer 14 as the upper layer, and the first base layer 22B has a film structure with high crystal orientation.

The magnetic recording medium 10B includes the base layer 22A having a two-layer structure, so that the orientation and the granular structure of the recording layer 14 are further improved, and thus, the magnetic characteristics can be further improved.

In addition, in the magnetic recording medium 10B, a seed layer having a single-layer structure may be provided instead of the seed layer 21A having a two-layer structure. As the seed layer having a single-layer structure, the seed layer 21 in the first embodiment can be used.

Modified Example 3

In the first embodiment, the configuration has been described where the magnetic recording medium 10 includes the crystal control layer 13, the protective layer 15, the lubricating layer 16, and the back coat layer 17. However, these layers can be provided or omitted as necessary. In addition, in some configuration, at least one of the crystal control layer 13, the protective layer 15, the lubricating layer 16, and the back coat layer 17 may be omitted.

Modified Example 4

In the first embodiment, the example where the superelastic alloy is a NiTi alloy has been described. However, the superelastic alloy is not limited thereto, and the superelastic alloy may be an alloy containing Cu and Zn, an alloy containing Ni and Al, or the like.

Modified Example 5

In the first embodiment, the example where the superelastic body is a superelastic alloy has been described. However, the superelastic body may be an organic material having a superelastic function.

2. Second Embodiment 2.1. Configuration of Magnetic Recording Medium

Figure 4A:
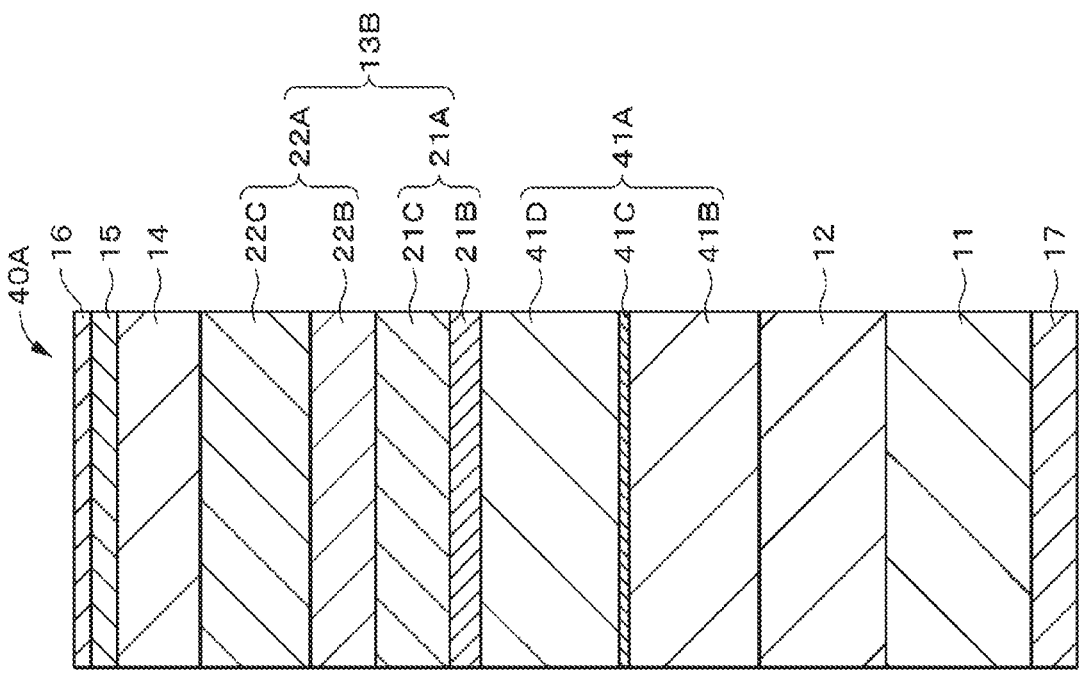
FIG. 4A is a cross-sectional diagram schematically illustrating an example of a configuration of a magnetic recording medium according to a second embodiment of the present technology.

The magnetic recording medium 40 according to the second embodiment of the present technology is a so-called double-layer perpendicular magnetic recording medium, and as illustrated in FIG. 4A, the SUL 41 is provided between the superelastic film 12 and the crystal control layer 13B. The magnetic recording medium 40 according to the second embodiment is suitable for use in a recording/reproducing apparatus using a single-pole type (SPT) recording head and a tunnel magnetoresistive (TMR) type reproducing head.

The film thickness of the SUL 41 is preferably 40 nm or more, and more preferably in a range of 40 nm or more and 140 nm or less. If the film thickness of the SUL 41 is 40 nm or more, better recording and reproducing characteristics can be obtained. On the other hand, if the film thickness of the SUL 41 is 140 nm or less, the crystal orientation of the base layer 22A can be prevented from being deteriorated due to the coarsening of the crystal grains of the SUL 41, and the film formation time of the SUL 41 is prolonged, so that a reduction in productivity can be avoided. The SUL 41 contains a soft magnetic material in an amorphous state. As a soft magnetic material, for example, a Co-based material, an Fe-based material, or the like can be used. The Co-based materials include, for example, CoZrNb, CoZrTa, CoZrTaNb, and the like. Examples of the Fe-based material include FeCoB, FeCoZr, FeCoTa, and the like.

2.2. Effect

In the magnetic recording medium 40 according to the second embodiment, by providing the SUL 41 under the recording layer 14 which is the perpendicular magnetic layer, the demagnetization field of the generation of magnetic poles generated in the surface layer of the recording layer 14 is suppressed, and inducing the head magnetic flux to the SUL 41 plays a role in helping to generate a sharp head magnetic field. Accordingly, in the magnetic recording medium 40 having a surface recording density higher than that in the first embodiment, good recording and reproducing characteristics can be realized.

2.3. Modified Example

Modified Example 1

Figure 4B:
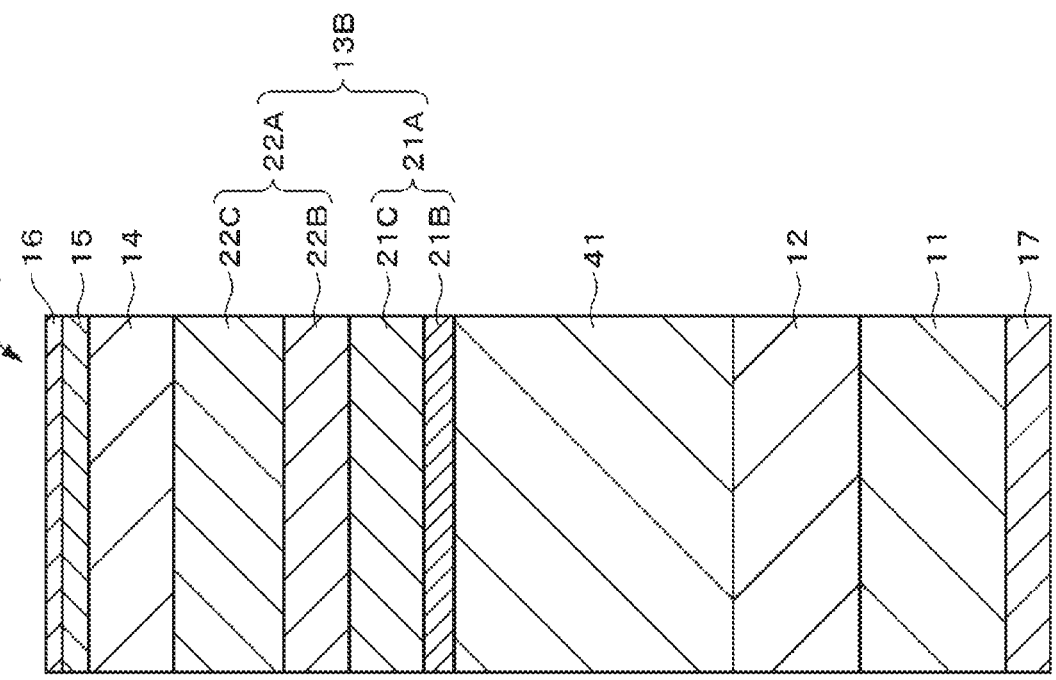
FIG. 4B is a cross-sectional diagram schematically illustrating an example of a configuration of a magnetic recording medium according to Modified Example 1 of the second embodiment of the present technology.

As illustrated in FIG. 4B, the recording 40A may be provided with an antiparallel coupled SUL (hereinafter, referred to as an "APC-SUL") 41A. The APC-SUL 41A has a structure where two soft magnetic layers 41B and 41D are stacked with a thin intermediate layer 41C interposed therebetween, and magnetizations thereof are positively coupled in antiparallel by using exchange coupling through the intermediate layer 41C. It is preferable that the film thicknesses of the soft magnetic layers 41B and 41D are substantially the same. The total film thickness of the soft magnetic layers 41B and 41D is preferably 40 nm or more, and more preferably in a range of 40 nm or more and 140 nm or less. If the total film thickness is 40 nm or more, better recording and reproducing characteristics can be obtained. On the other hand, if the total film thickness is 140 nm or less, the film formation time of the APC-SUL 41A is prolonged, so that a reduction in productivity can be avoided. It is preferable that the materials of the soft magnetic layers 41B and 41D are the same material, and as the material, a material similar to that of the SUL 41 in the second embodiment can be used. The thickness of the intermediate layer 41C is, for example, in a range of 0.8 nm or more and 1.4 nm or less, preferably in a range of 0.9 nm or more and 1.3 nm or less and more preferably about 1.1 nm. By selecting the thickness of the intermediate layer 41C in a range of 0.9 nm or more and 1.3 nm or less, better recording and reproducing characteristics can be obtained. As a material of the intermediate layer 41C, V, Cr, Mo, Cu, Ru, Rh, and Re can be exemplified, and in particular, Ru is preferably contained.

In the magnetic recording medium 40A, since the APC-SUL 41A is used, the soft magnetic layer 41B which is the lower layer and the soft magnetic layer 41D which is the upper layer are exchange-coupled in antiparallel to each other, and in the remnant magnetization state, the total magnetization amount of the upper and lower layers becomes zero. Therefore, it is possible to suppress occurrence of spike-shaped noise which occurs in a case where the magnetic domain in the APC-SUL 41A moves. Accordingly, the recording and reproducing characteristics can be further improved.

Modified Example 2

In the second embodiment, the configuration where the crystal control layer is the crystal control layer 13B in Modified Example 2 of the first embodiment has been described as an example. However, the crystal control layer may be the crystal control layer 13 in the first embodiment or may be the crystal control layer 13A in Modified Example 1 of the first embodiment.

Modified Example 3

In the second embodiment, the configuration has been described where the magnetic recording medium 40 includes the crystal control layer 13B, the protective layer 15, the lubricating layer 16, and the back coat layer 17. However, these layers can be provided or omitted as necessary. In addition, in some configuration, at least one of the crystal control layer 13B, the protective layer 15, the lubricating layer 16, and the back coat layer 17 may be omitted.

3. Third Embodiment

3.1. Overview

In the first embodiment described above, the magnetic recording medium in which the recording layer and the crystal control layer are vacuum thin films produced by a vacuum thin film manufacturing technique (dry process) such as sputtering has been described. On the other hand, in the third embodiment, a magnetic recording medium in which the recording layer and the base layer are coating films produced by a coating process (wet process) will be described.

3.2. Configuration of Magnetic Recording Medium

Figure 5:
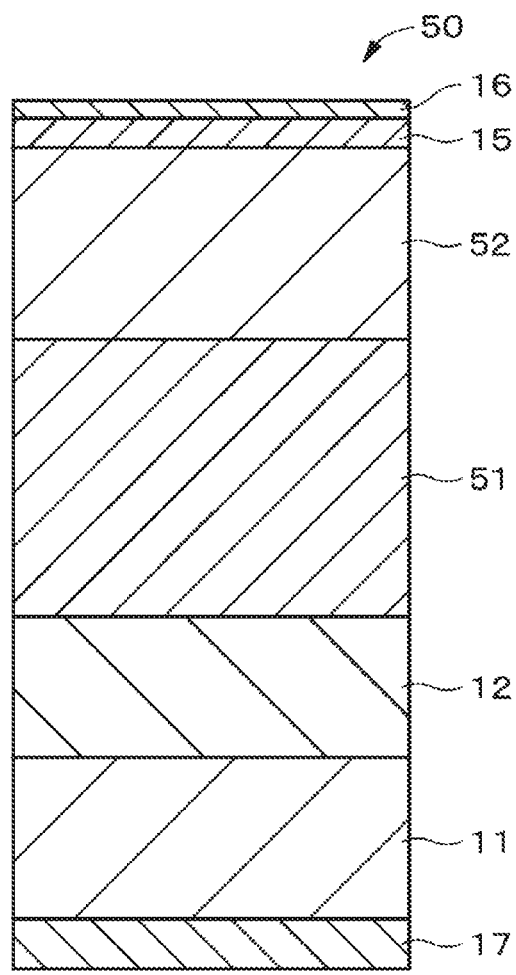
FIG. 5 is a cross-sectional diagram schematically illustrating an example of a configuration of a magnetic recording medium according to a third embodiment of the present technology.

A magnetic recording medium 50 according to the third embodiment of the present technology is a so-called coating type magnetic recording medium and, as illustrated in FIG. 5, includes a substrate 11, a superelastic thin film 12 provided on the surface of the substrate 11, a base layer 51 provided on the superelastic thin film 12, a recording layer 52 provided on the base layer 51, a protective layer 15 provided on the recording layer 52, a lubricating layer 16 provided on the protective layer 15, and a back coat layer 17 provided on the back surface of the substrate 11. In addition, in the third embodiment, components similar to those in the first embodiment are denoted by the same reference numerals, and the description thereof is omitted.

Base Layer

The base layer 51 is a non-magnetic layer containing a non-magnetic powder and a binder. If necessary, the base layer 51 may further contain various additives such as conductive particles, a lubricant, an abrasive, a curing agent, and a rust inhibitor.

The non-magnetic powder may be an inorganic material or an organic material. In addition, the non-magnetic powder may be carbon black or the like. As the inorganic material, for example, a metal, a metal oxide, a metal carbonate, a metal sulfate, a metal nitride, a metal carbide, a metal sulfide, and the like may be exemplified. As the shape of the non-magnetic powder, for example, various shapes such as a needle shape, a spherical shape, a cubic shape, and a plate shape may be exemplified, but the shape of the non-magnetic powder is not limited thereto.

As the binder, a resin having a structure where a crosslinking reaction is applied to a polyurethane resin, a vinyl chloride resin, or the like is preferred. However, the binder is not limited thereto, and other resins may be appropriately mixed according to physical properties or the like required for the magnetic recording medium 50. The resin to be mixed is not particularly limited as long as the resin is generally used in a coating type magnetic recording medium.

Recording Layer

The recording layer 52 is, for example, a magnetic layer containing a magnetic powder and a binder. The recording layer 52 may further contain various additives such as conductive particles, a lubricant, an abrasive, a curing agent, and a rust inhibitor, as necessary.

The magnetic powder is, for example, an iron oxide, a chromium iron oxide, a cobalt iron oxide, a metal magnetic powder, or a barium ferrite. From the viewpoint of improving the recording density, the magnetic powder is preferably a powder of nano magnetic particles such as a hexagonal ferrite, a cubic ferrite, or an ε-iron oxide (ε-$Fe_2O_3$). The binder is similar to that of the base layer 51 described above.

3.3. Magnetic Recording Medium Manufacturing Method

Hereinafter, an example of a method of manufacturing the magnetic recording medium 50 according to the third embodiment of the present technology will be described.

Film Formation Process of Superelastic Thin Film

First, the superelastic thin film 12 is formed on the surface of the substrate 11. As a method of forming the superelastic thin film 12, for example, a CVD method or a PVD method can be used. Next, the superelastic thin film 12 is annealed to be crystallized by for example, a radiation source for infrared ray irradiation. Therefore, the superelastic function of the superelastic thin film 12 is exhibited.

Adjustment Process of Coating Material

Next, the coating material for forming the base layer is prepared by kneading and dispersing a non-magnetic powder, a binder, and the like in a solvent. Next, the coating material for forming the recording layer is prepared by kneading and dispersing a magnetic powder, a binder, and the like in a solvent. Next, the coating material for forming the back coat layer is prepared by kneading and dispersing a binder, inorganic particles, a lubricant, and the lake in a solvent. In preparing the coating material for forming the base layer, the coating material for forming the recording layer, and the coating material for forming the back coat layer, for example, the following solvents, dispersing apparatus, and kneading apparatus can be applied.

As the solvent used for preparing the above-mentioned coating material, for example, ketone type solvents such as acetone, methyl ethyl ketone, methyl isobutyl ketone, and cyclohexanone, alcohol type, solvents such as methanol, ethanol, and propanol, ester type solvents such as methyl acetate, ethyl acetate, butyl acetate, propyl acetate, ethyl lactate, and ethylene glycol acetate, ether type solvents such as diethylene glycol dimethyl ether, 2-ethoxyethanol, tetrahydrofuran, and dioxane, aromatic hydrocarbon type solvents such as benzene, toluene, and xylene, halogenated hydrocarbon type solvents such as methylene chloride, ethylene chloride, carbon tetrachloride, chloroform, chlorobenzene, and the like may be exemplified. These solvents may be used independently, or may be mixed appropriately to be used.

As the kneading apparatus used for preparing the above-mentioned coating material, for example, a kneading apparatus such as a biaxial continuous kneader, a biaxial continuous kneader capable of diluting in multiple stages, a kneader, a pressure kneader, a roll kneader, or the like can be used. However, the kneading apparatus is not particularly limited to these apparatuses. In addition, as the dispersing apparatus used for preparing the above-mentioned coating material, for example, a dispersing apparatus such as a roll mill, a ball mill, a horizontal sand mill, a vertical sand mill, a spike mill, a pin mill, a tower mill, a pearl mill (for example, "DCP mill" manufactured by Maschinenfabrik Gustav Eirich GmbH & Co KG or the like), a homogenizer, an ultrasonic wave disperser can be used. However, the dispersing apparatus is not particularly limited to these apparatuses.

Film Formation Process of Base Layer

Next, the base layer 51 is formed on the superelastic thin film 12 by applying a coating material for forming the base layer on the superelastic thin film 12 formed on the surface of the substrate 11 and performing drying.

Film Formation Process of Recording Layer

Next, the recording layer 52 is formed on the base layer 51 by applying the coating material for forming the recording layer on the base layer 51 and performing drying. The subsequent processes are similar to those in the first embodiment.

3.4. Effect

In the third embodiment, the superelastic thin film 12 is provided between the substrate 11 and the base layer 51. Accordingly, the effects similar to those in the first embodiment described above can be obtained.

3.5. Modified Example

In the third embodiment, the configuration has been described where the magnetic recording medium 50 includes the base layer 51, the protective layer 15, the lubricating layer 16, and the back coat layer 17. However, these layers can be provided or omitted as necessary. In addition, in some configuration, at least one of the base layer 51, the protective layer 15, the lubricating layer 16, and the back coat layer 17 may be omitted.

EXAMPLES

Hereinafter, the present technology will be specifically described with reference to examples, but the present technology is not limited to only these examples.

Example 1

Film Formation Process of Superelastic Thin Film

First, under the following film formation conditions, a superelastic thin film including an NiTi alloy was formed to have a thickness of 50 nm on the surface of an elongated polymer film as a non-magnetic substrate, and after that, crystallization was achieved by annealing treatment.
Sputtering method: DC magnetron sputtering method
Target: $Ni_{50.5}Ti_{49.5}$ target
Degree of vacuum: $2\times10^{-5}$ Pa or less
Gas type: Ar
Gas pressure: 0.67 Pa

Film Formation Process of Base Layer

Next, under the following film formation conditions, a base layer including Ru was formed to have a thickness of 100 nm on the superelastic thin film.
Sputtering method: DC magnetron sputtering method
Target: Ru target
Degree of vacuum: $2\times10^{-5}$ Pa or less
Gas type: Ar
Gas pressure: 1.5 Pa

Film Formation Process of Recording Layer

Next, under the following film formation conditions, a recording layer including $(CoCrPt)$—$(SiO_2)$ was formed as a recording layer to have a thickness of 20 nm the base layer.
Sputtering method: DC magnetron sputtering method
Target: $(Co_{75}Cr_{10}Pt_{15})_{90}$—$(SiO_2)_{10}$ target
Degree of vacuum: $2\times10^{-5}$ Pa or less
Gas type: Ar
Gas pressure: 1.5 Pa

Film Formation Process of Protective Layer

Next, under the following film formation conditions, a protective layer including carbon was formed to have a thickness of 5 nm on the recording layer.
Sputtering method: DC magnetron sputtering method
Target: carbon target
Degree of vacuum: $2\times10^{-5}$ Pa or less
Gas type: Ar
Gas pressure: 1.0 Pa

Film Formation Process of Lubricating Layer

Next, a carboxylic acid compound as a lubricant was applied on the protective layer to form a lubricating layer.

Film Formation Process of Back Coat Layer

Next, a coating material for forming a back coat layer was applied on the back surface of the polymer film and dried to form the back coat layer. Therefore, the intended magnetic was obtained.

Comparative Example 1

A magnetic tape was obtained similarly to Example 1 except that the film formation process of the superelastic thin film was omitted.

Evaluation of Reading Reliability

The reading reliability of the magnetic tape obtained as described above was evaluated in the following manner.

First, the error rate of the magnetic tape before the test was measured. Next, after running the magnetic tape for one hour in a running device, a test of performing a cycle of attaching and detaching the cartridge 100 times was performed. Next, the error rate after the test was measured, and the error rates before and after the test were compared.

As a result of the evaluation, in the magnetic tape having the superelastic thin film (Example 1), almost no deterioration of the error rate was observed after the test. This is because the plastic deformation of the magnetic layer and the base layer is suppressed by the superelastic thin film, and thus, the contact of the head with the surface of the magnetic tape is maintained favorably. On the other hand, in the magnetic tape having no superelastic thin film (Comparative Example 1), remarkable deterioration of the error rate was observed after the test. This is because the contact of the head with the surface of the magnetic tape was deteriorated due to the plastic deformation occurring in the magnetic layer and the base layer.

Heretofore, although the embodiments of the present technology, Modified Examples thereof, and Examples thereof have been specifically described, the present technology is not limited to the above-described embodiments, Modified Examples thereof, and Examples thereof, and various modifications based on the technical idea of the present technology are possible.

For example, the configurations, methods, processes, shapes, materials, numerical values, and the like described in the above-described embodiments, Modified Examples thereof, and Examples thereof are merely examples, and as necessary, different configurations, methods, processes, shapes, materials, numerical values, and the like may be used.

In addition, the configurations, methods, processes, shapes, materials, numerical values, and the like of the above-described embodiments, Modified Examples thereof, and Examples thereof can be combined with each other as long as the combination does not deviate from the spirit of the present technology.

In addition, in the above-described embodiments, Modified Examples thereof, Examples thereof, the example where the present technology is applied to a flexible elongated magnetic recording medium has been described. The present technology is not limited to this example and can be applied to a disk-shaped magnetic recording medium having rigidity, so-called hard disk.

Furthermore, the present technology may adopt the following configuration.

(1)
A magnetic recording medium including:
a substrate;
a recording layer; and
a layer being provided between the substrate and the recording layer, the layer containing a superelastic body.

(2)

The magnetic recording medium according to (1), in which the substrate is an elongated substrate having flexibility.

(3)

The magnetic recording medium according to (1) or (2), in which the superelastic body is a superelastic alloy.

(4)

The magnetic recording medium according to (3), in which the superelastic alloy contains Ti and Ni.

(5)

The magnetic recording medium according to any of (1) to (4), further including a crystal control layer provided between the layer containing the superelastic body and the recording layer.

(6)

The magnetic recording medium according to any of (1) to (4), further including a soft magnetic layer provided between the layer containing the superelastic body and the recording layer.

(7)

The magnetic recording medium according to (6), in which the soft magnetic layer includes a first soft magnetic an intermediate layer and a second soft magnetic layer.

(8)

The magnetic recording medium according to any of (1) to (7), in which the recording layer is a perpendicular recording layer.

(9)

The magnetic recording medium according to (8), in which the perpendicular recording layer contains Co, Pt, and Cr and has a granular structure.

(10)

The magnetic recording medium according to any of (1) to (4), in which the recording layer contains a magnetic powder and a binder.

REFERENCE SIGNS LIST 10, 10A, 10B, 40, 40A, 50 Magnetic recording medium
11 Substrate
12 Superelastic thin film
13, 13A, 13B Crystal control layer
14, 52 Recording layer
15 Protective layer
16 Lubricating layer
17 Back coat layer
21, 21A Seed layer
21B First seed layer
21C Second seed layer
22, 22A Base layer
22B First base layer
22C Second base layer
41 SUL
41A APC-SUL It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A magnetic recording medium comprising:
a substrate having a substrate thickness ranging from 3 μm to 8 μm;
a recording layer;
a layer being provided between the substrate and the recording layer, the layer including a superelastic body, wherein the superelastic body includes a Ti—Ni based alloy including 50.5 atomic % or less of Ni; and
a crystal control layer provided between the layer including the superelastic body and the recording layer,
wherein the crystal control layer includes a base layer, and
wherein the base layer is provided directly on the layer including the superelastic body, and
wherein the base layer includes Ru.

2. The magnetic recording medium according to claim 1, wherein the substrate is an elongated substrate having flexibility.

3. The magnetic recording medium according to claim 1, further comprising a soft magnetic layer provided between the layer including the superelastic body and the recording layer.

4. The magnetic recording medium according to claim 3, wherein the soft magnetic layer includes a first soft magnetic layer, an intermediate layer, and a second soft magnetic layer.

5. The magnetic recording medium according to claim 1, wherein the recording layer is a perpendicular recording layer.

6. The magnetic recording medium according to claim 5, wherein the perpendicular recording layer includes Co, Pt, and Cr and has a granular structure.

7. The magnetic recording medium according to claim 1, wherein the recording layer includes a magnetic powder and a binder.

8. The magnetic recording medium according to claim 1, wherein the layer being provided between the substrate and the recording layer has a thickness of about 50 nm.

9. The magnetic recording medium according to claim 1, wherein the Ti—Ni based alloy includes 50 atomic % to 50.5 atomic % of Ni.

10. The magnetic recording medium according to claim 1, wherein the Ti—Ni based alloy exhibits a superelastic function at a temperature of 45° Celsius or less.

11. The magnetic recording medium according to claim 1, wherein the crystal control layer does not include a seed layer.

\* \* \* \* \*